United States Patent [19]

Park et al.

[11] Patent Number: 4,542,655
[45] Date of Patent: Sep. 24, 1985

[54] BOREHOLE STRESS-METER AND METHOD AND APPARATUS FOR THE INSTALLATION THEREOF

[75] Inventors: Duk-Won Park, Northport; Theodore W. Ryan, Moundville, both of Ala.

[73] Assignee: University of Alabama, University, Ala.

[21] Appl. No.: 608,654

[22] Filed: May 9, 1984

[51] Int. Cl.⁴ .................... G01B 7/16; G01N 33/24
[52] U.S. Cl. ........................................ 73/784; 73/151
[58] Field of Search .................. 73/151, 783, 784, 785

[56] References Cited

U.S. PATENT DOCUMENTS

| | | | |
|---|---|---|---|
| 2,927,459 | 3/1960 | Farrington | 73/784 |
| 3,349,610 | 10/1967 | Noël | 73/784 |
| 3,483,745 | 12/1969 | Ublacker | 73/784 |
| 3,557,886 | 1/1971 | Cobbs | 175/50 |
| 4,159,641 | 7/1979 | Hawkes | 73/784 |

FOREIGN PATENT DOCUMENTS 1355579  2/1964  France ................... 73/784

*Primary Examiner*—Howard A. Birmiel
*Attorney, Agent, or Firm*—Oblon, Fisher, Spivak, McClelland & Maier

[57] ABSTRACT

A borehole stress-meter includes a resiliently radially expandable hollow body within which can be positioned a gage plug having strain gages fixed thereto. The interior section of the hollow body is tapered, as is the gage plug so that advancement of the gage plug within the hollow body will cause the gage plug to become prestressed. The hollow body can be inserted into a bore drilled in earth material whose stress is to be measured by an installation or setting tool. Subsequently, the gage plug is advanced within the hollow body so as to prestress the gage plug. The setting tool is then removed and stress may be measured by an appropriate strain indicator.

23 Claims, 13 Drawing Figures

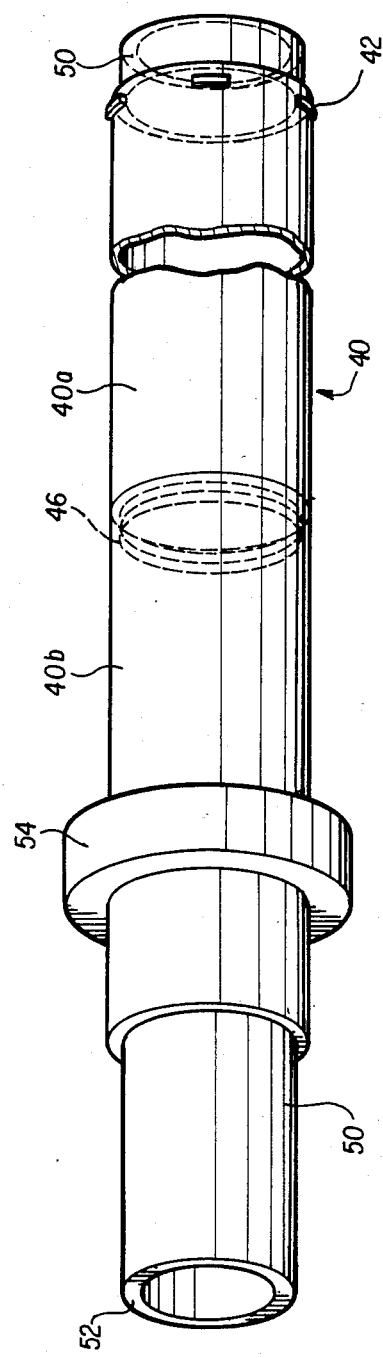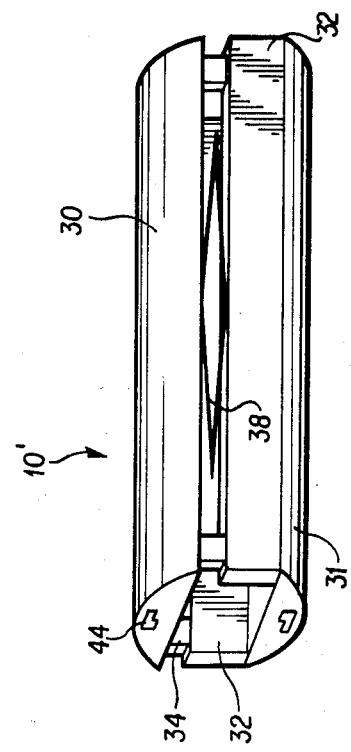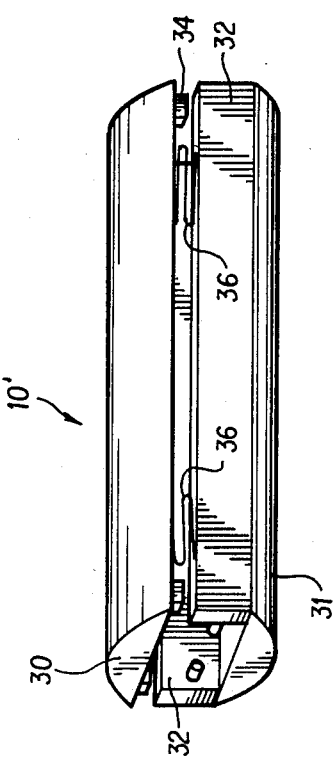

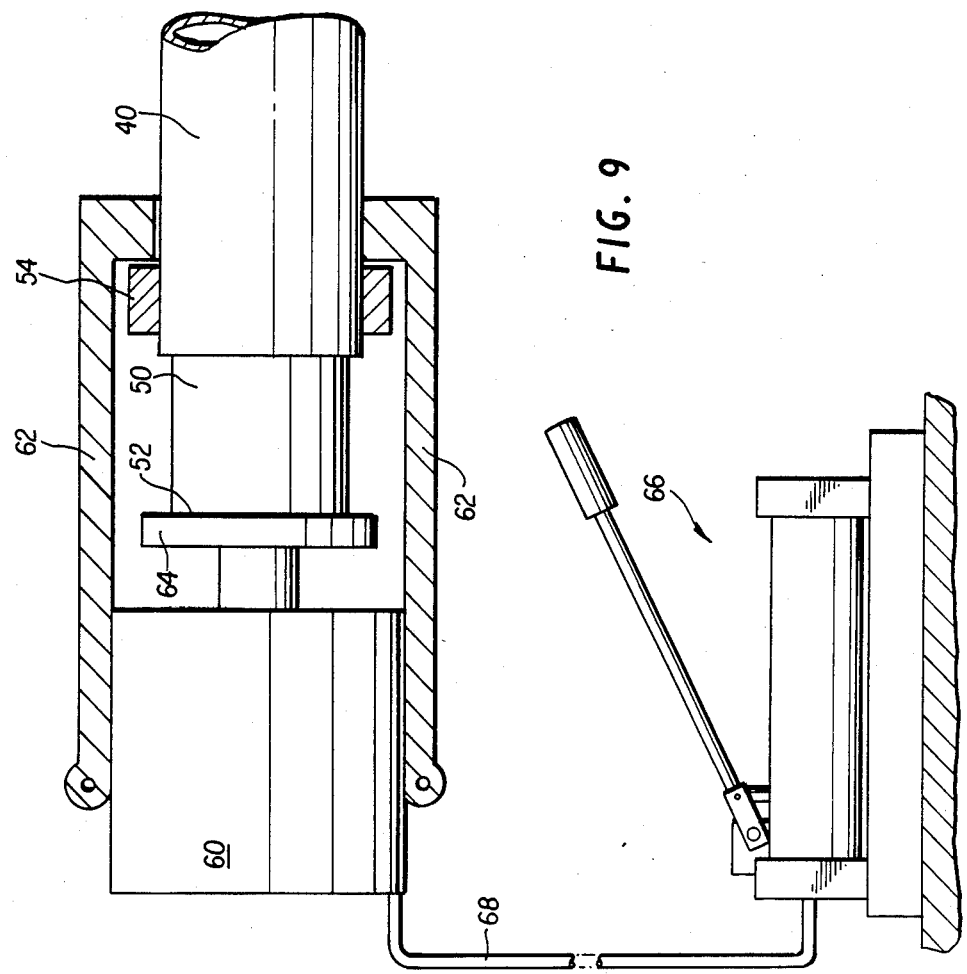

BOREHOLE STRESS-METER AND METHOD AND APPARATUS FOR THE INSTALLATION THEREOF

BACKGROUND OF THE INVENTION

1. Field of the Invention

The present invention is directed to a stress-meter for measuring stress in earth material such as rock or soil. The invention is further directed to a method and apparatus for installing the stress-meter.

2. Description of the Prior Art

It often becomes necessary to measure the stress of earth materials such as rock or soil. For example, the deformation measurements in soil or rock layers are of importance in fields such as geology, mining and oil prospecting. For this purpose, it is conventional to drill a borehole in the earth material whose stress is to be measured, and to insert sensors into the boreholes. Conventional sensors are photoelastic borehole plugs, to which are attached electrical resistant strain gages, load cells, flat jacks, vibrating wire gages or cylindrical jacks. The signals from the sensors are read out by suitable conventional equipment and subsequently processed into numeric data indicative of stress, by use of calibration factors obtained before insertion of the gages, or equations developed from an analytical method.

Examples of known systems for measuring stress in earth materials may be found in U.S. Pat. No. 3,349,610 to Noel and U.S. Pat. No. 2,927,459 to Farrington. However, known systems suffer the shortcoming of being expensive and being difficult to install and use. For example, in the Noel system the halves of a shell are separated by hydraulic piston elements located within the shell itself. It is therefore necessary to extend hydraulic lines far into the borehole, creating the danger of leakage and increasing the complexity of the system. In the Farrington arrangement, each section of the sounder is required to contain a motor and gearing for expanding probes associated with the strain gages. The requirement for such complex mechanical elements within the sounder itself also raises the problem of unreliability and complexity of construction.

SUMMARY OF THE INVENTION

It is an object of the present invention to provide a borehole stress-meter for determining the stress in earth material such as rock or soil.

It is a further object of the present invention to provide a borehole stress-meter which is structurally simple.

It is a further object of the present invention to provide a borehole stress-meter which can be installed easily and inexpensively.

It is a further object of the present invention to provide a borehole stress-meter installation device for easily and inexpensively installing the borehole stress-meter.

It is a further object of the present invention to provide a method for installing a borehole stress-meter and measuring stress.

It is a further object of the present invention to provide a borehole stress-meter which can detect stress levels of as little as one pound per square inch.

It is a further object of the present invention to provide a borehole stress-meter which is sensitive to a dynamic stress of 200 cycles per second.

It is a further object of the present invention to provide a borehole stress-meter which can be inserted far into the borehole.

These objects, and others, are carried out according to the present invention by providing a gage plug upon which strain gages can be fixed. The gage plug has a tapered outer surface and is insertable within a hollow body having a similar tapered configuration. The size of the gage plug is such that it can freely fit in one end of the hollow body but, at some point along its length, contacts the tapered inner surface of the hollow body so that further movement of the gage plug creates radial stresses in the hollow body and gage plug. The hollow body itself is constructed so that it can resiliently expand in the radial direction. In one embodiment, the hollow body is a cylindrical pipe having axial slots. In another embodiment, the hollow body is a shell having circumferentially spaced portions, some of which are connected via springs.

In order to insert the hollow within a borehole drilled in the earth material whose stress is to be measured, a setting device is provided for inserting the hollow body within the borehole. This device can be in the form of one or more pipes which are axially releasably connected. One end of one of these pipes includes releasable connections for the hollow body. The hollow body can be inserted into a borehole for a large distance by use of several connected lengths of the pipe. Alternatively, the insertion device can be in the form of a setting head having a spring stabilized releasable connection to the hollow body.

Upon the insertion of the hollow body into a borehole, the hollow body having the gage plug loosely positioned therein, one can prestress the gage plug and strain gages thereon by advancing the gage plug into the hollow body until the tapered gage plug begins to resiliently radially expand the hollow body. This advancement of the gage plug is accomplished by either a mechanical or hydraulic element which is advanced through the hollow body setting pipe or the setting head. In the case of a setting pipe, the gage plug can be advanced by a second pipe which is longer than the setting pipe and which is slidable therein. The second pipe can be advanced manually or with the aid of a hydraulic jack. In the case of the setting head, the gage plug is advanced by a piston slidable therein. The piston can be either manually or hydraulically advanced.

After the installation and prestressing of the gage plug within the hollow body, the setting device is removed at the releasable connection. The strain gages are connected to a device for measuring and processing the strain detected by the strain gages before or during the setting steps. The strain gages can be set for either measuring plane stress or uniaxial stress.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein:

FIG. 6 is an orthogonal view showing a device for installing or setting the hollow body of FIGS. 4 and 5 within a borehole and for manually advancing the gage plug within the hollow body;

FIG. 7 is an orthogonal view of a second embodiment of the hollow body;

FIG. 8 is an orthogonal view of a variant of the embodiment of FIG. 7;

FIG. 9 shows a hydraulic device for advancing the gage plug within the hollow body;

DETAILED DESCRIPTION OF THE PREFERRED EMBODIMENTS

Figure 1:
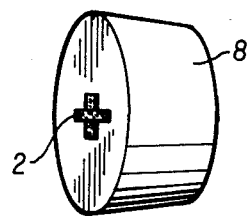
FIG. 1 is an orthogonal view of a first embodiment of the gage plug upon which the strain gages are fixed for plane stress measurement.

The invention will now be described with reference to several nonlimiting embodiments. Identical or similar elements will be referred to by use of the same reference numerals throughout the several views.

Figure 2:
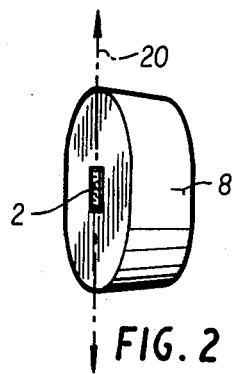
FIG. 2 is an orthogonal view of a second embodiment of the gage plug upon which strain gages are fixed for uniaxial stress measurement.
Figure 3:
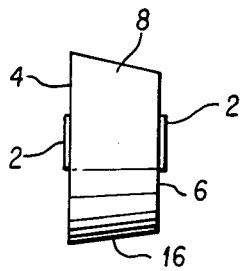
FIG. 3 is a side view of the gage plug of FIGS. 1 or 2, showing the tapered surface of the gage plug.

As seen in FIGS. 1-3, strain gages 2 are rigidly adhesively bonded onto axial end surfaces 4 and 6 of gage plug 8 or 8'. As will be described below, when measuring plane stress, the tapered cylindrical gage plug of FIG. 1 is used whereas when measuring uniaxial stress only a portion of the plug is cylindrical and side surfaces of the cylinder are flattened, as seen in FIG. 2. The gage plug is formed of metal, plexiglass or other composite material, depending upon the desired stress response characteristics.

Figure 2A:
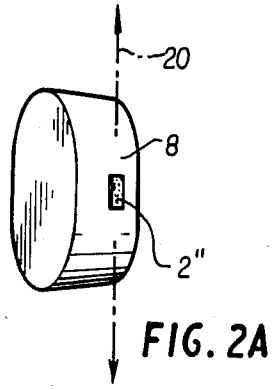
FIG. 2A is a variant of the embodiment of FIG. 2.

When measuring plane stress, two strain gages 2 mounted for strain measurement along two mutually perpendicular directions, or three strain gages (2') mounted in triangular pattern, are bonded to each end surface or the gage plug 8 or 8'. When measuring uniaxial stress, as seen in FIGS. 2 and 2A, only a single strain gage 2 or 2" need be provided on each end surface or on each side, each strain gage being oriented for strain measurement along the same direction 20.

Although not shown, leads can be attached to each of the strain gages. The leads provide electrical signals to a device for processing the signals from the strain gages and calculating the stress from which the strain being measured was derived. An example of such a signal processing device is the Strain Indicator model P-3500 or P-350A manufactured by Instruments Division, Measurement Group Incorporated of Raleigh, North Carolina.

Figure 4:
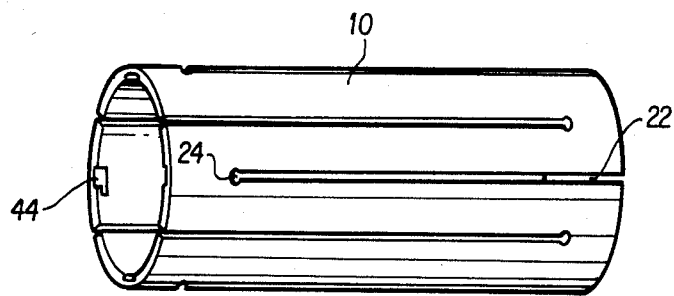
FIG. 4 is an orthogonal view of a first embodiment of the hollow body within which the gage plug is inserted.
Figure 1A:
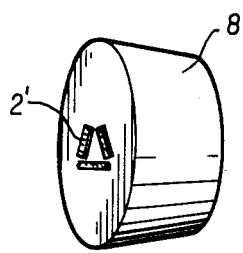
FIG. 1A is a variant of the embodiment of FIG. 2.
Figure 5:
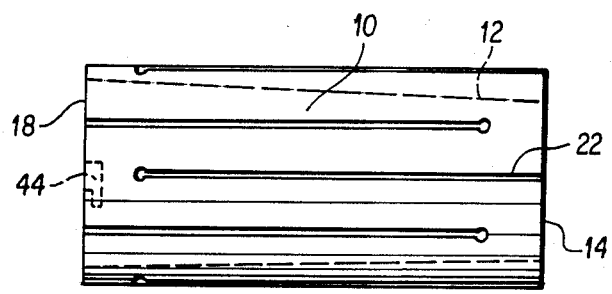
FIG. 5 is a side view of the hollow body of FIG. 4.

In order to provide a uniform stress distribution to the gage plug, the gage plug is held within a radially expandable hollow body during use. A first embodiment of such a hollow body is seen in FIGS. 4 and 5. The hollow body of this embodiment is in the form of a cylinder 10. The cylinder can be formed of metal or plastic, again depending upon the stress response characteristics desired. The cylinder 10 has a tapered conical inner surface 12 whose diameter grows progressively smaller toward the end 14. The taper can range from between 1° and 5°, and corresponds in slope to the taper of the peripheral surface of 16 of the gage plug, as best seen in FIG. 3. The gage plug is sized so that it can freely fit in the larger end 18 of the cylinder 10 but, at some point along the length of the cylinder 10, the tapered surface 16 of the gage plug fits snugly against the correspondingly shaped tapered inner surface 12 of the cylinder 10. At this point, any further movement of the gage plug toward end 14 of the cylinder 10 will radially stress both the gage plug and the cylinder. In the case of the gage plug of FIG. 1, the stress will be applied about the entire circumference of the gage plug so that plane stress can be measured. In the case of the gage plug of FIG. 2, only those curved portions of the gage plug adjacent the stress measuring direction 20 will be so stressed, and so stress applied along this direction can be measured by the strain gages 2 which are oriented so as to measure strain in the direction 20.

As can be seen in FIGS. 4 and 5, the wall of the cylinder 10 has a circumferentially spaced array of slots 22 extending entirely therethrough in the radially direction. Each of the slots begins at one axial end of the cylinder and terminates at a point along the length of the cylinder. Alternating slots originate at opposite ends 14 or 18 of the cylinder 10 so that the cylinder can radially expand or contract in an even manner. Each of the slots terminates in an enlarged portion 24 in order to avoid the development of stress concentrations at the ends of the slots.

As mentioned above, when the gage plug 8 or 8' is advanced into the cylinder 10 from end 18 toward end 14, at some point along the length of the cylinder the gage plug will snugly fit against the tapered surface 12 of the cylinder. In the case of the gage plug 8, which has a circular section identical to that of the cylinder 10, the gage plug will fit snugly against the surface 12 about its entire periphery. In the case of the gage plug 8', whose sides are straight, only the curved periphery adjacent the direction 20 will conform to the shape of the surface 12 and fit thereagainst. Further movement of the gage plug toward the end 14 of the cylinder will cause axial expansion of the cylinder 10, by expanding the slots 22 until snug contact with rock walls of the borehole is achieved, and the resilience of the material of the cylinder will result in a compressive prestressing of the gage plug.

A second embodiment of the hollow body is seen in FIGS. 7 and 8. Here, rather than providing a single cylindrical element having axial slots, the expandable hollow body 10' is formed of circumferentially opposing first portions 30 and 31 and circumferentially opposing second or side portions 32. The first portions 30 and 31 have a cylindrical outer configuration while the second portions 32 have flat outer sides. The first portion 31 is welded to the sides 32 while the other first portion 30 includes lugs 34 which fit in slots of the second portions 32 for maintaining the relative positions of the first portion 30 relative to the second portions 32. The first portion 30 and the second portions are biased apart so as to create expansion in the radial direction by springs positioned between each of the second portions and the first portion 30. In the embodiment of FIG. 7 the springs 36 are curved whereas in the embodiment of FIG. 8 the springs 38 are straight. Although not shown in the FIGURES, it is to be understood that there is set of springs between the first portion 30 and each of the side portions. Similarly, it is to be understood that a sufficient number of lugs 34 are provided to maintain the relative positioning of the elements. It is further to be understood that the first and second portions define an interior bore whose sectional area is tapered so as to progressively decrease from the left to the right in FIGS. 7 and 8. If the embodiment of FIGS. 7 and 8 is used, the shape of the gage plugs will, of course, be modified so as to conform to the shape of the tapered hollow defined by the expandable hollow body 10'.

When inserting the stress-meter into a bore of earth material whose stress is to be measured, it is often desirable to insert the hollow body far into the bore. In order to accomplish this, the setting or installation tool of FIG. 6 is provided. The setting tool is formed from one or more first pipes 40. One of the first pipes 40a is connected directly to the expandable hollow body 10 or 10' by use of releasable connectors. The releasable connectors can, for example, be in the form of a bayonet joint or twist-lock joint provided by lugs 42 on one end of the first pipe 40a and corresponding slots or notches 44 (see FIGS. 4 and 5) on the end 18 of the hollow body 10 or on one end of the first portions 30 in FIGS. 7 and 8. The first pipe 40a is twist-locked onto the hollow body and the hollow body is inserted into a bore via this first pipe. If the hollow body must be inserted far into a bore, a threaded connection 46 can be provided between the first pipe 40a and additional first pipes 40b.

When installing the stress-meter in a borehole of earth material, the following procedure can be followed. First, the borehole is drilled in the earth material, the borehole having a slightly larger diameter than that of the hollow body 10 or 10' (0.05 inches to 0.3 inches larger than the diameter of the hollow body, depending upon the taper angle). The gage plug 8 or 8' is then inserted in the larger end of the hollow defined by the hollow body. Subsequently, the pipe 40a is connected to the hollow body via the lugs 42 and the notches 44. The hollow body is then inserted into the borehole and situated at the proper depth, while allowing the lead wires from the strain gages to be threaded through the slots of the hollow body 10 or between the adjacent portions of the hollow body 10' of FIGS. 7 and 8. Additional pipes are used if necessary.

It then becomes necessary to advance the gage plug to the right (as seen in the FIGURES) within the hollow body, so as to prestress the gage plug, as described above. When using the first pipes 40 of FIG. 6, this can be accomplished by providing a plunger in the form of a second pipe 50. The second pipe 50 has a length greater than the sum of all of the first pipes 40a and 40b, and has a smaller diameter, so that it can slide within the first pipes. The pipe 50 is therefore inserted into the first pipes with the end 52 thereof extending out of the first pipes and the opposite end of the pipe 50 contacting the gage plug 8 or 8'. A ring 54 may be clamped to the exterior of the first pipes 40 to prevent them from advancing further into the bore of the earth material. One can then tap on the end 52 of the second pipe 50, the opposite end of which is in contact with the gage plug, thereby causing both the gage plug and the second pipe to advance to such a position that the gage plug is prestressed. The strain gages, which have been connected to a strain indicator (not shown), will then provide an indication of prestress. If the prestress level does not reach a desired value at this time, a thin metal lining can be wrapped around the hollow body in order to reduce the gap between the borehole in the earth material and the hollow body.

It may become necessary to provide a large amount of prestress. Under those circumstances, one may use the hydraulic apparatus shown in FIG. 9. As can there be seen, a hydraulic cylinder 60 can be positioned behind the second pipe 50. Connector arms 62 pivoted to the hydraulic cylinder can be moved to the position shown in FIG. 9 to engage the ring 54 so that the cooperation between the arms 62 and the ring 54 prevents movement of the hydraulic cylinder to the left, while the piston 64 of the hydraulic cylinder is pressed against the end 52 of the second pipe 50 to prevent movement of the cylinder to the right. Subsequently, the hydraulic jack 66 can be actuated so as to provide hydraulic fluid to the cylinder 60 via the lines 68, thereby causing the piston 64 to advance to the right, and so advance both the second pipe 50 and the gage plug 8 or 8' for prestressing of the gage plug.

Once the gage plug has been prestressed, the first pipes 40 can be disconnected from the hollow body 10 or 10' and stress can be measured on the strain indicator which has been connected to the strain gages.

Figure 10:
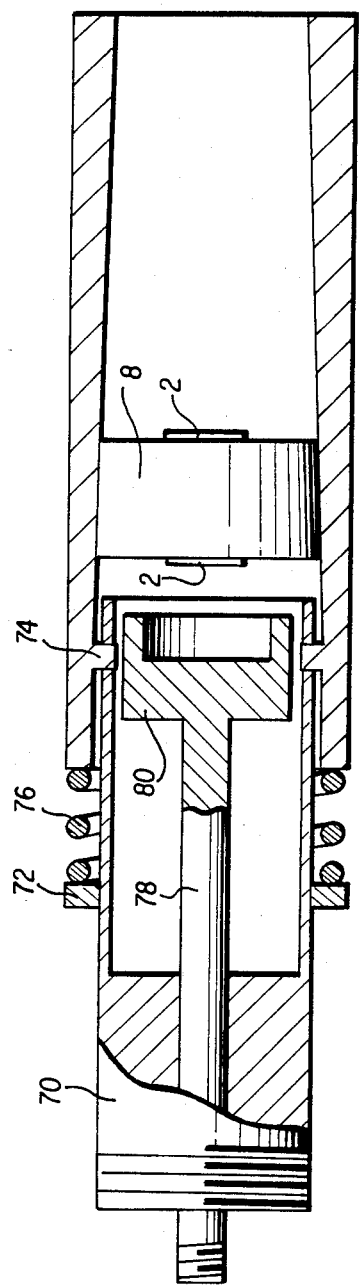
FIG. 10 is a sectional view of a second embodiment of a device for setting the hollow body within a borehole.
Figure 11:
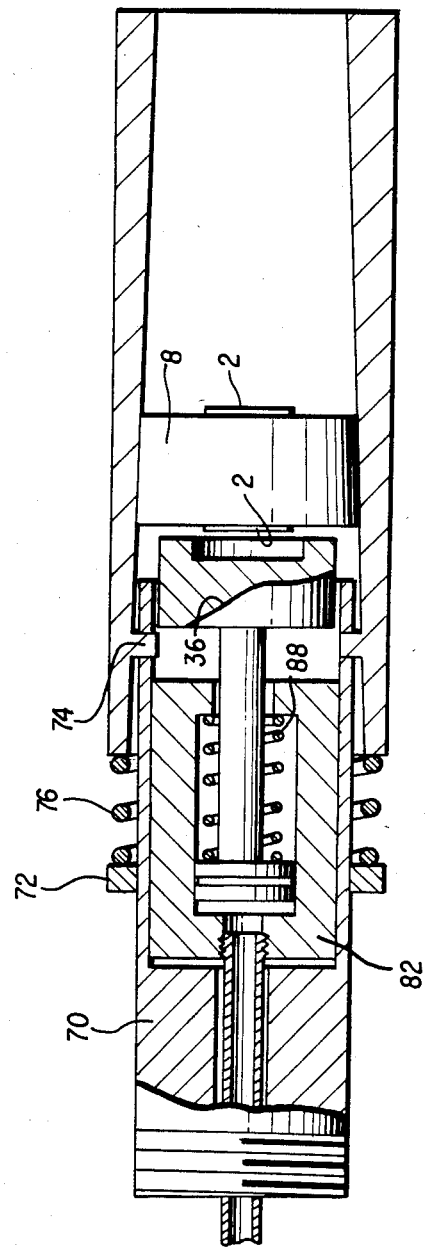
FIG. 11 is a sectional view showing a variant of the embodiment of FIG. 10.

An alternative setting device is shown in FIGS. 10 and 11. In FIG. 10, a setting head 70 is provided with an external ring 72 and is releasably connected to a hollow body via a twist-lock or bayonet connection. In the embodiment of FIG. 10, the setting head is shown connected to the first portions 30 of hollow body 10' of FIG. 7 via lugs 74 on the first portions 30 and notches, similar to the notches 44, provided on the end of the setting head. Of course, the setting head could also be attached to the hollow body 10 of FIGS. 4 and 5 if the notches 44 are replaced by lugs 74. A stabilizing spring 76 engaged between the ring 72 and the end of the hollow body maintains the relative positions between the setting head 70 and the hollow body.

A plunger in the form of a piston 78 is slidable within the setting head and terminates in a piston head 80 which can engage the gage plug. The piston can be advanced either manually or via a hydraulic jack such as that of FIG. 9.

In the embodiment of FIG. 11, the setting head 70 defines a hydraulic cylinder 82 supplied with hydraulic fluid via line 84. Within the hydraulic cylinder 82 is a piston 86 which is biased into a retracted position by a spring 88. In order to advance the gage plug, the hydraulic fluid is applied via the line 84 and advances the piston 86 so that it contacts and advances the gage plug. Following the release of hydraulic pressure, the spring 88 causes the piston 86 to retract.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A borehole stress-meter comprising:
   a hollow body having a first longitudinal axis, said body defining an internal bore extending from a first end of said body to a second end of said body, said bore having a cross-section which decreases in area from said first end to said second end, said hollow body including means for permitting resilient radial expansion thereof;

a gage plug having a shape corresponding to at least a portion of said bore and being sized so that said gage plug can fit in said first end of said bore, and not in said second end of said bore, without causing said radial expansion of said hollow body;

at least one strain gage fixed on at least one surface of said gage plug, said strain gage adapted for emitting a signal proportional to a strain of said gage plug; and signal processing means operatively connected to said at least one strain gage for processing said signal.

2. The stress-meter of claim 1 wherein said hollow body comprises a cylinder formed of a resilient material, said cylinder having axial slots as said means for permitting resilient axial expansion thereof.

3. The stress-meter of claim 1 wherein said hollow body comprises:

first and second circumferentially opposed sections having external surfaces defining circumferential portions of a cylinder;

third and fourth circumferentially opposed sections connecting said first and second sections to form said body; and spring means engaged between at least two of said sections, said spring means comprising said means for permitting resilient axial expansion.

4. The stress-meter of claim 1 wherein said bore is continuously tapered from said first end to said second end and wherein said gage plug has a second longitudinal axis and is tapered in the axial direction.

5. The stress-meter of claim 4 wherein said at least one strain gage is fixed to at least one axial end of said gage plug.

6. The stress-meter of claim 4 including one strain gage fixed on each axial end of said gage plug, said strain gages being oriented to measure strain along a line connecting portions of said gage plug having a shape corresponding to said bore.

7. The stress-meter of claim 4 including two strain gages fixed on each axial end of said gage plug, said strain gages on each of said end being oriented to measure strain along lines which are mutually perpendicular, whereby a strain of each said axial end may be measured in any direction.

8. The stress-meter of claim 1 including means for inserting said hollow body within a bore of a body whose stress characteristics are to be measured, said means for inserting comprising:

at least one first pipe; and means for releasably connecting one end of one said first pipe to said first end of said hollow body.

9. The stress-meter of claim 8 including means for prestressing said gage plug in said hollow body, said means for prestressing comprising:

a plunger insertable in said first pipe and longer than said first pipe so that a first end of said plunger can engage said gage plug; and means for advancing said plunger in said first pipe such that said one end of said plunger advances said gage plug towards said second end of said hollow body, whereby said hollow body is resiliently expanded against said body whose stress characteristics are to be measured and said gage plug prestressed.

10. The stress-meter of claim 9 wherein said means for advancing comprise a first hydraulic cylinder having a first piston positionable against said plunger and means for holding said first hydraulic cylinder relative to said first pipe.

11. The stress-meter of claim 8 wherein said means for releasably connecting comprise a twist lock mechanism.

12. The stress-meter of claim 10 wherein said means for holding said first hydraulic cylinder relative to said first pipe comprises a ring fixed to said first pipe and means associated with said first hydraulic cylinder and holding said ring.

13. The stress-meter of claim 11 wherein said first pipe comprises a setting head and said means for releasably connecting further comprise a stabilizing spring engaged between said hollow body and a portion of said setting head.

14. The stress-meter of claim 9 wherein said plunger comprises a second pipe.

15. The stress-meter of claim 9 wherein said setting head defines a second hydraulic cylinder, said plunger comprises a second piston of said second hydraulic cylinder and said means for advancing comprises a source of pressurized hydraulic fluid for said second hydraulic cylinder.

16. A method for measuring stress in earth material, said method comprising the steps of:

drilling a borehole of a first diameter in said earth material;

providing an expandable hollow body having at least an exterior portion in the form a cylinder with a diameter marginally smaller than said first diameter and having a tapered internal bore;

inserting into a larger end of said internal bore a gage plug having at least one strain gage fixable thereto;

inserting said hollow body in said borehole;

advancing said gage plug in said internal bore towards a smaller end of said internal bore, whereby said hollow body is expanded against said earth material and said gage plug is prestressed; and processing strain related signals emitted from said at least one strain gage.

17. The method of claim 16 wherein said step of inserting said hollow body into said borehole comprises the steps of:

connecting a first pipe to an end of said hollow body having said larger internal bore end such that said hollow body and said first pipe are aligned; and inserting said hollow body into said borehole, beginning with an end of said hollow body having said smaller internal bore end, by use of said first pipe.

18. The method of claim 17 wherein said step of advancing said gage plug comprises advancing a plunger through said first pipe and into contact with said gage plug, and subsequently advancing said plunger.

19. The method of claim 18 wherein said plunger is manually advanced.

20. The method of claim 18 wherein said plunger is hydraulically advanced.

21. The method of claim 17 including the step of removing said first pipe from said hollow body after said gage plug is advanced.

22. The stress-meter of claim 4 wherein said at least one strain gage is fixed to at least one lateral side of said gage plug.

23. The stress-meter of claim 4 including one strain gage fixed on each lateral side of said gage plug, said strain gages being oriented to measure strain along a line connecting portions of said gage plug having a shape corresponding to said bore.

* * * * *